United States Patent
Thexton et al.

(10) Patent No.: US 10,686,795 B2
(45) Date of Patent: Jun. 16, 2020

(54) SYSTEM FOR CONTROLLING ACCESS TO A PLURALITY OF TARGET SYSTEMS AND APPLICATIONS

(71) Applicant: Accenture Global Solutions Limited, Dublin (IE)

(72) Inventors: Rexall E. Thexton, Neshanic Station, NJ (US); Gaurav Tandon, Wokingham (GB); Sanjeev Shukla, Croydon (GB); Anthony McCoy, Dublin (IE); Sidath Mudiyanselage, Westmeath (IE); Andrew Poole, Dublin (IE); Hannah Craddock, Dublin (IE); Qurrat Ul Ain, Dublin (IE); Colleen Connolly, Dublin (IE); Farbod Kamiab, Dublin (IE)

(73) Assignee: Accenture Global Solutions Limited, Dublin (IE)

(*) Notice: Subject to any disclaimer, the term of this patent is extended or adjusted under 35 U.S.C. 154(b) by 87 days.

(21) Appl. No.: 16/016,154

(22) Filed: Jun. 22, 2018

(65) Prior Publication Data
US 2019/0260755 A1    Aug. 22, 2019

Related U.S. Application Data

(63) Continuation-in-part of application No. 15/900,475, filed on Feb. 20, 2018.

(51) Int. Cl.
*H04L 29/06* (2006.01)

(52) U.S. Cl.
CPC ............ *H04L 63/102* (2013.01); *H04L 63/20* (2013.01)

(58) Field of Classification Search
CPC ...... H04L 63/08; H04L 63/102; H04L 67/306
See application file for complete search history.

(56) References Cited

U.S. PATENT DOCUMENTS

| 7,865,931 B1 | 1/2011 | Stone et al. |
| 8,751,941 B1 | 6/2014 | Kaushik et al. |

(Continued)

OTHER PUBLICATIONS

Examination Report No. 1, dated Oct. 15, 2019, pp. 1-8, issued in Australian Patent Application No. 2019201186, Offices of IP Australia, Woden, ACT, Australia.

(Continued)

*Primary Examiner* — Jason K Gee
(74) *Attorney, Agent, or Firm* — Brinks Gilson & Lione

(57) ABSTRACT

A method for controlling access to one or more of a plurality of target systems includes receiving profile data that defines one or more features associated with a plurality of individuals with one or more entitlements of those individuals. Each entitlement is indicative of target system access. The method further includes generating a model that includes one or more sets of rules where each set of rules is associated with an entitlement of the profile data. Each entitlement is indicative of target system/application access. Each rule within a set relates a combination of one or more features of the profile data with a confidence value. Profile data that defines one or more features associated with a target individual is received from a first user management system. A listing that includes one or more entitlements associated with the target individual, and confidence values associated with the one or more entitlements is generated based on the profile data and the rules. Each confidence value is indicative of whether the target individual should be granted a corresponding entitlement. For each entitlement having a corresponding confidence value higher than a predetermined threshold, an instruction is communicated to a target system associated with the entitlement to allow the target individual access to the target system.

20 Claims, 11 Drawing Sheets

(56) References Cited

U.S. PATENT DOCUMENTS

| | | |
|---|---|---|
| 8,931,055 B2 | 1/2015 | Shea et al. |
| 8,978,114 B1 | 3/2015 | Kaushik et al. |
| 10,333,918 B2 | 6/2019 | Kruse |
| 2007/0214497 A1 | 9/2007 | Montgomery et al. |
| 2010/0199346 A1* | 8/2010 | Ling ............... H04L 63/0263 726/12 |
| 2013/0047229 A1* | 2/2013 | Hoefel ............... G06F 21/629 726/7 |
| 2014/0165193 A1* | 6/2014 | El-Rafei ............ G06F 11/0715 726/22 |
| 2015/0033292 A1* | 1/2015 | Nguyen ............... H04L 63/08 726/4 |
| 2015/0067889 A1 | 3/2015 | Baikalov et al. |
| 2015/0135305 A1* | 5/2015 | Cabrera ............... G06F 21/62 726/17 |
| 2017/0093871 A1* | 3/2017 | Abuelsaad ........... H04L 63/104 |

OTHER PUBLICATIONS

U.S. Office Action, dated Nov. 18, 2019, pp. 1-16, issued in U.S. Appl. No. 16/581,087, U.S. Patent and Trademark Office, Alexandria, VA.

U.S. Office Action, dated Dec. 4, 2019, pp. 1-19, issued in U.S. Appl. No. 15/900,475, U.S. Patent and Trademark Office, Alexandria, VA.

Notice of Allowance, dated Mar. 2, 2020, pp. 1-12, issued in U.S. Appl. No. 16/581,087, U.S. Patent and Trademark Office, Alexandria, VA.

Notice of Allowance, dated Mar. 3, 2020, pp. 1-8, issued in U.S. Appl. No. 15/900,475, U.S. Patent and Trademark Office, Alexandria, VA.

* cited by examiner

400

| EmployeeID | Department | Location | Level | Ent |
|---|---|---|---|---|
| 001 | Finance | Dublin | 7 | None |
| 002 | Finance | Dublin | 7 | ENT_A |
| 003 | Finance | Dublin | 8 | ENT_A |
| 004 | Finance | Dublin | 9 | ENT_A |
| 005 | Finance | London | 8 | ENT_A |
| 006 | Finance | London | 8 | ENT_A |
| 007 | Finance | Paris | 10 | ENT_A |
| 008 | Finance | Berlin | 11 | ENT_A |
| 009 | Finance | Berlin | 8 | ENT_A |
| 010 | Finance | Oslo | 6 | ENT_A |

| EmployeeID | Department | Location | Level |
|---|---|---|---|
| 002 | Finance | Dublin | 7 |
| 003 | Finance | Dublin | 8 |
| 004 | Finance | Dublin | 9 |
| 005 | Finance | London | 8 |
| 006 | Finance | London | 8 |
| 007 | Finance | Paris | 10 |
| 008 | Finance | Berlin | 11 |
| 009 | Finance | Berlin | 8 |
| 010 | Finance | Oslo | 6 |

| ItemSet | Freq (HR Feature & Ent) |
|---|---|
| [Finance] | 9 |
| [Level8] | 4 |
| [Dublin] | 3 |
| [London] | 2 |
| [Berlin] | 2 |

| EmployeeID | F1 | F2 | F3 |
|---|---|---|---|
| 002 | Finance | Dublin | |
| 003 | Finance | 8 | Dublin |
| 004 | Finance | Dublin | |
| 005 | Finance | 8 | London |
| 006 | Finance | 8 | London |
| 007 | Finance | | |
| 008 | Finance | Berlin | |
| 009 | Finance | 8 | Berlin |
| 010 | Finance | | |

| ItemSet | Freq (HR Feature & Ent) |
|---|---|
| [Finance] | 9 |
| [Finance, Level8] | 4 |
| [Finance, Level8, London] | 3 |
| [Finance, Dublin] | 2 |
| [Finance, Berlin] | 1 |
| [Finance, level8, Berlin] | 1 |
| [Finance, level8, Dublin] | 1 |

460

| ItemSet | Freq (HR Feature & Ent) | Freq Total | Updated Confidence |
|---|---|---|---|
| [Finance] | 9 | 10 | 0.9 |
| [Finance, Level8] | 4 | 4 | 1 |
| [Finance, Level8, London] | 3 | 3 | 1 |
| [Finance, Dublin] | 2 | 3 | 0.67 |
| [Finance, Berlin] | 1 | 1 | 1 |
| [Finance, level8, Berlin] | 1 | 1 | 1 |
| [Finance, level8, Dublin] | 1 | 1 | 1 |

| ItemSet | Freq (HR Feature & Ent) | Freq Total | Updated Confidence |
|---|---|---|---|
| [Finance] | 9 | 10 | 0.9 |
| [Finance, Level8] | 4 | 4 | 1 |
| ~~[Finance, Level8, London]~~ | 3 | 3 | 1 |
| [Finance, Dublin] | 2 | 3 | 0.67 |
| [Finance, Berlin] | 1 | 1 | 1 |
| ~~[Finance, level8, Berlin]~~ | 1 | 1 | 1 |
| ~~[Finance, level8, Dublin]~~ | 1 | 1 | 1 |

Fig. 4H

SYSTEM FOR CONTROLLING ACCESS TO A PLURALITY OF TARGET SYSTEMS AND APPLICATIONS

RELATED APPLICATIONS

This application is a continuation-in-part application under 35 U.S.C. § 120 to U.S. application Ser. No. 15/900,475, filed Feb. 20, 2018, which is incorporated herein by reference in its entirety.

BACKGROUND

Field

This application generally relates to computer management within an enterprise. In particular, this application describes a system and method for controlling access to a plurality of target systems and applications within an organization.

Description of Related Art

Companies typically utilize systems such as enterprise resources planning (ERP) systems, customer relationship management (CRM) systems, supply chain management (SCM) systems, etc., to integrate management functions of core business processes of the company such as marketing processes, sales processes, logistics processes, etc. Access to each of these systems is typically controlled by system owners (IT or Business) and managed by administrators of the respective systems. Administrators in this case act as a delegate of the system owner.

When an employee or a contractor (requestor) requires access to one of these systems, the employee may have to navigate a myriad of bureaucratic hurdles, request methods, forms and system list, access entitlements, profiles and roles relevant for a system to obtain access. For example, the requestor may first need to know what to request (e.g., system, entitlements, role or profile), what he may need, and then may have to request approval from various individuals in his chain of command. Upon receiving approval, the requestor may have to provide evidence to each administrator, delegate of the system owner, etc. that he has received the necessary approvals. Thus, obtaining access can be time consuming and may tie up critical processing and network bandwidth.

An access management (i.e., creation, modification and deletion) request is often a composite action of bundled tasks that requires a series of tasks that need to be performed in a particular sequence to achieve requested outcomes. Such bundling of tasks is also performed to make it easy for requestor and approvers of such requests to specify what they need and what needs to be approved. Unbundling of such request and determination of what tasks need to be performed is left to the human administrators and their knowledge of underlying system landscape or intermediary systems like an access management system. Such technical complexity is mainly attributable to:

Defense in depth or layered security; i.e., critical systems are protected by an array of control devices and methods like firewalls, VLANs, VPNs, Secure desktop access;

Principle of least privilege; i.e., access to a system must only be provided if needed to perform a task;

Segregation of responsibilities to limit access to highly privileged and administrative tasks;

Ease of access administration; e.g., grouping of individuals that require similar privileges on a system or an external security mechanism like LDAP;

Network design (security zones) and physical implementation considerations;

Centralization of access administration through user management systems; and

Use of external authentication systems.

Despite attempts to group and simplify requests, the above mentioned factors often result in to complicated data and forms that a requestor and approver needs to understand and complete. As such, requestors and approvers may request more access for an individual that what is actually required or may request access for the individual based on a different persons access privileges, which may not be relevant to the individual. In some cases, carte blanche access to the various systems may be requested with limited or no controls within the company.

However, in larger organizations, granting access this way may increase security concerns associated with these systems. Moreover, additional processing power, network resources, storage, etc., will be required to accommodate access by all the employees. This may result in inefficient use of company resources when such access is not actually required.

SUMMARY

In first aspect, a system for controlling access to one or more of a plurality of target systems and/or applications includes an input/output (IO) subsystem, a storage device, a processor, and non-transitory computer readable media in communication with the processor. The IO subsystem is configured to receive profile data that defines one or more features associated with a target individual from a human resources (HR) or contractor management or a user management system, and to communicate instructions to facilitate access to the one or more target systems/applications for the target individual. The storage device includes one or more sets of rules where each set of rules is associated with an entitlement of the profile data. Each entitlement is indicative of target system/application access. Each rule within a set relates a combination of one or more features of the profile data with a confidence value. The processor is in communication with the IO subsystem, the storage device, and the non-transitory computer readable media. The non-transitory computer readable media stores instruction code which, when executed by the processor, causes the processor to control the IO subsystem to receive the profile data associated with a target individual. The processor generates, based on the profile data and the rules, a listing that includes one or more entitlements associated with the target individual, and confidence values associated with the one or more entitlements. Each confidence value is indicative of whether the target individual should be granted a corresponding entitlement. For each entitlement having a corresponding confidence value higher than a predetermined threshold, the processor controls the IO subsystem to communicate an instruction either to an intermediary system (user provisioning system or a ticketing queue for manual provisioning) or directly to the target system/application associated with the entitlement to allow access to the target individual.

In a second aspect, a method for controlling access to one or more of a plurality of target systems/applications includes receiving profile data that defines one or more features associated with a plurality of individuals with one or more entitlements of those individuals. Each entitlement is indicative of target system/application access. The method further includes generating one or more sets of rules where each set of rules is associated with an entitlement of the profile data. Each entitlement is indicative of target system/application access. Each rule within a set relates a combination of one or more features of the profile data with a confidence value. Profile data that defines one or more features associated with a target individual is received from a human resources (HR) or a contractor management or a user management system. A listing that includes one or more entitlements associated with the target individual, and confidence values associated with the one or more entitlements is generated based on the profile data and the rules. Each confidence value is indicative of whether the target individual should be granted a corresponding entitlement. For each entitlement having a corresponding confidence value higher than a predetermined threshold, an instruction is communicated to a target system/application associated with the entitlement to allow the target individual access to the target system.

In a third aspect, non-transitory computer readable media that stores instruction code for controlling access to one or more of a plurality of target systems/applications is provided. The instruction code is executable by a machine for causing the machine to perform acts that include receiving profile data that defines one or more features associated with a plurality of individuals with one or more entitlements of those individuals, each entitlement indicative of target system/application access. One or more sets of rules is generated. Each set of rules is associated with an entitlement of the profile data. Each entitlement is indicative of target system/application access. Each rule within a set relates a combination of one or more features of the profile data with a confidence value. Profile data that defines one or more features associated with a target individual from a human resources (HR) or contractor management or a user management system is received. The processor generates, based on the profile data and the rules, a listing that includes one or more entitlements associated with the target individual, and confidence values associated with the one or more entitlements. Each confidence value is indicative of whether the target individual should be granted a corresponding entitlement. For each entitlement having a corresponding confidence value higher than a predetermined threshold, the processor communicates an instruction either to an intermediary system (user provisioning system or a ticketing queue for manual provisioning) or directly to the target system/application associated with the entitlement to allow access to the target individual.

BRIEF DESCRIPTION OF THE DRAWINGS

FIGS. 4A-4H illustrate exemplary tables of information that facilitate generating exemplary rules that related feature combinations to entitlements;

DETAILED DESCRIPTION

The embodiments described below overcome the problems described in the background by providing a system that automatically determines entitlements needed by a target individual/employee. As used herein, the terms entitlement and privilege refer to access to a specific target system and/or application operating on the target system by an individual. Individuals having an entitlement to a target system and/or application are granted access to the target system and/or application.

In general, the system generates a set of rules for different entitlements that map feature combinations associated with the different entitlements to confidence values. Features correspond to different attributes associated with individuals of the enterprise such as a start date, title, supervisor name, group ID, etc. When a target individual joins the enterprise, the system applies the rules against the target individual to determine possible entitlements to grant to the target individual. In some implementations, the system may automatically communicate instructions to target systems and/or applications associated with the entitlements to grant access. In addition or alternatively, the system may generate entitlement recommendations for review by appropriate personnel, which may then be approved or rejected.

The system may also periodically request usage information from the target systems/applications to determine whether individuals with entitlements to these target systems actually require access to these target systems. Entitlements for individuals deemed to not require access may be revoked. In a larger enterprise, this may greatly reduce the number of individuals having entitlements to target systems of the enterprise. This in turn facilitates a reduction in the number of processors, network resources, storage, etc., required by the target systems.

This system will keep learning from the feeds on a recurring or on real time basis. The system uses this data to update the model in unassisted way or in some instances with the assistance of minimal human interaction and automatically adjust its prediction and confidence for entitlements accordingly.

Figure 1:
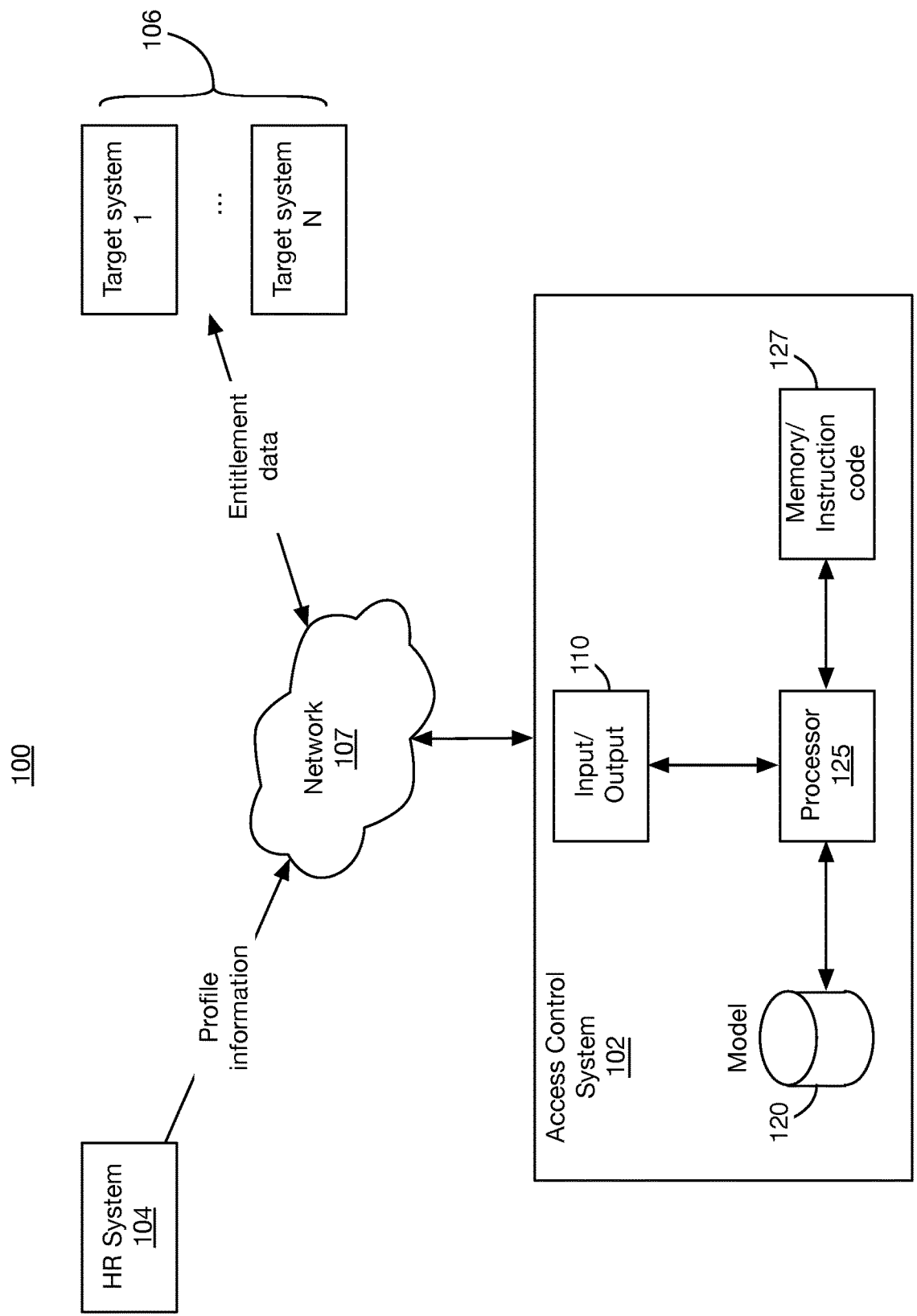
FIG. 1 illustrates an exemplary enterprise environment that includes a system that facilitates controlling access to a group of target systems and/or applications.

FIG. 1 illustrates an exemplary enterprise environment 100 that includes various systems/devices that facilitate controlling access to a plurality of target systems. Exemplary systems/devices of the environment 100 include an access control system (ACS) 102, a human resources (HR) system 104, and a group of target systems 106. The ACS 102, HR system 104, and target systems 106 may communicate with one another via a network 107, such as the Internet.

The HR system 104 and target systems 106 may correspond to computer systems such as an Intel®, AMD®, or PowerPC® based computer system or a different computer system and can include application specific computer systems. The computer systems may include an operating system, such as Microsoft Windows®, Linux, Unix® or other operating system.

The HR system 104 may be operated by a user/individual who is associated with the enterprise 100 such as a human resources administrator associated with the enterprise 100. The HR system 104 may facilitate specifying information associated with a target individual such as profile data. Exemplary profile data may include biographic information (e.g., name, address) along with enterprise specific information such as an employment start date, title, grade level, manager name, group, years of experience, etc.

The HR system/s 104 may store information associated with the target individual to a database repository that includes profile information associated with any number of employees of the enterprise 100. In this regard, the HR system/s 104 may be configured to facilitate communicating profile information stored in the database repository to the ACS 102 via one or more APIs of the ACS 102. For example, the HR system/s 104 may be configured to communicate with the ACS 102 via an API such as a webserver API, a SOAP-based web service, a RESTful API, and/or a different type of API.

The target systems 106 correspond to various computers located throughout the enterprise configured to perform specific tasks. For example, a first target system 106 may correspond to an enterprise resource planning (ERP) system, a second target system 106 may correspond to a customer relationship management (CRM) system, a third target system 106 may correspond to a supply chain management (SCM) system. Each target system 106 may implement a form of access control to prevent unauthorized access. Moreover, each target system 106 may host various applications and each application may have its own form of access control to prevent unauthorized access. As used herein, access to a system and/or an application operating on the system is referred to as an entitlement or privilege.

Each target system 106 is further configured to communicate and receive entitlement related information via one or more APIs of the ACS 102. For example, each target system 106 may be configured to communicate with the ACS 102 via an API such as a webserver API, a SOAP-based web service, a RESTful API, and/or a different type of API. The entitlement related information may correspond to an instruction, from the ACS 102, to grant access to the target system 106 and/or specific applications operating on the target system 106. The entitlement related information may correspond to information communicated from the target system 106 to the ACS 102 that provides a listing of individuals with entitlements to the target system 106 and/or applications operating on the target system 106.

In addition, the information communicated from the target system 106 may provide usage information indicative of how often individuals use the target system 106 and/or applications operating on the target system 106. For example, the usage information may indicate the last time an individual used the target system 106, a frequency of usage (e.g., number of times a month), etc. This information facilitates determining whether individual actually have a need to access the target system 106.

The ACS 102 may include a processor 125, input/output subsystem 110, model storage 120, and instruction code storage 127. The ACS 102 may include other subsystems. As described in more detail below, the ACS 102 may generate a model 120 that relates profile data received from the HR system 104 and entitlement information received from the target system 106. The ACS 102 uses the model 120 to predict entitlements for target individuals such as new employees.

The I/O subsystem 110 of the ACS 102 is configured to facilitate communications with entities outside of the ACS 102. In this regard, the I/O processor 110 may be configured to dynamically determine the communication methodology utilized by entities of the environment 100 for communicating information to the entities using the determined communication methodology. For example, the I/O subsystem 110 may determine that a first entity utilizes a RESTful API and may, therefore, communicate with the entity using a RESTful communication methodology.

As described in more detail below, the I/O subsystem 110 may implement a web browser to facilitate generating one or more web-based interfaces through which users of the enterprise may interact with the ACS 102. The web browser may implement a web services interface to facilitate automating some of the web-based functionality via a computer. For example, one or more of the entities of the environment 100 may utilize the web services interfaces to access information stored by the ACS 102.

The processor 125 executes instruction code stored in a memory device 127 for coordinating activities performed between the various subsystems of the ACS 102. The processor 125 any of the subsystems of the ACS 102 referenced herein may correspond to a stand-alone computer system such as an Intel®, AMD®, or PowerPC® based computer system or a different computer system and can include application specific computer systems. The computer systems may include an operating system, such as Microsoft Windows®, Linux, Unix® or other operating system. It is contemplated that operations performed on the various subsystems may be combined into a fewer or greater number of subsystems to facilitate speed scaling, cost reductions, etc.

Exemplary operations performed by the processor 125 of the ACS 102 in controlling access to a plurality of target systems 106 are illustrated below. In this regard, the operations may be implemented via instruction code stored in non-transitory computer readable media 127 that resides within the subsystems configured to cause the respective subsystems to perform the operations illustrated in the figures and discussed herein.

Figure 2:
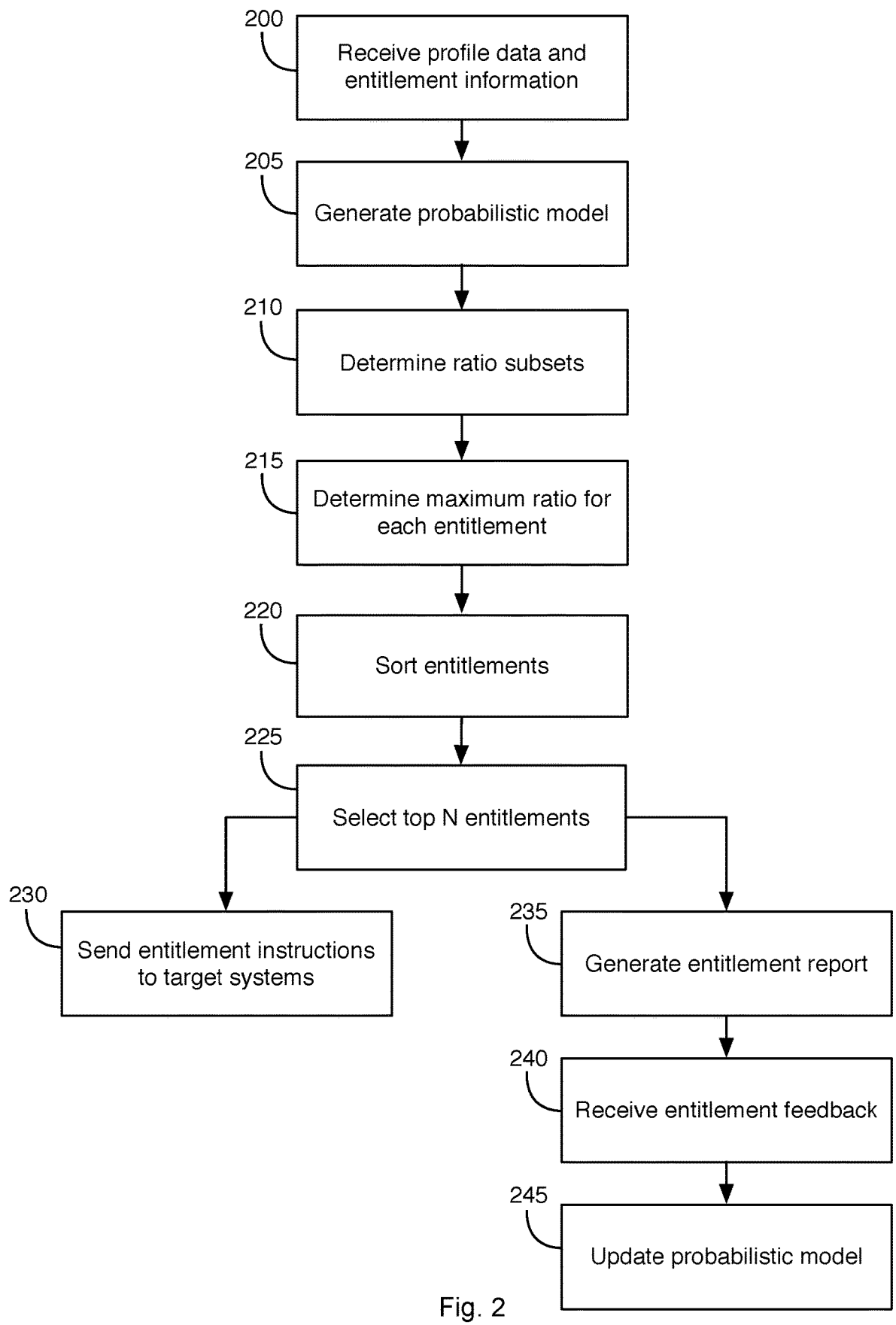
FIG. 2 illustrates first exemplary operations that implement a probabilistic approach to control access to a group of target systems and/or applications.

FIG. 2 illustrates first exemplary operations that implement a probabilistic approach to control access to a plurality of target systems 106.

At operation 200, the IO subsystem 110 may receive profile data from the HR system 104 and entitlement information from the target systems 106 associated with all or a large number of individuals/employees of the enterprise.

At operation 205, the processor may generate a model 120 that represents the proportion of people in the entire dataset having particular profile features for a particular entitlement, as illustrated in Table 1.

TABLE 1

| Entitlements | Features | | | |
|---|---|---|---|---|
| | F1 | F2 | F3 | ... |
| E1 | $P(E1|F1)$ | $P(E1|F2)$ | $P(E1|F3)$ | ... |
| E2 | $P(E2|F1)$ | $P(E2|F2)$ | $P(E2|F3)$ | ... |
| E3 | $P(E3|F1)$ | $P(E3|F2)$ | $P(E3|F3)$ | ... |
| ... | ... | ... | ... | |

Referring to Table 1, each row corresponds to a specific entitlement (i.e., E1, E2, E3, etc.) such as access to a particular target system 106 or application operating on the target system 106. Each column is associated with a feature (i.e., F1, F2, F3, etc.). A list of exemplary features is provided in Table 2.

TABLE 2

ProfitCenterDescription = CFM
CapabilityDescription = CFM
TalentSegmentDescription = Finance
JobCDDescription = 11
CompanyDescription = acc sol pvt ltd
CostCenterDescription = in-ms onshore-na
FacilityDescription = Bengaluru
EmployeeYearsOfService = 10
EmployeeStartDate = Jun. 1, 2007

The value in each cell corresponds to the ratio of employees who have a given entitlement and feature. For example, P(E1|F1) corresponds to the ratio, E1/F1, of employees having entitlement E1 and feature F1.

At operation 210, a subset of ratios relevant to a target individual is determined. For example, a subset of ratios associated with a target individual having features F1 and F3 is illustrated in Table 3.

TABLE 3

| Entitlements | Features | |
| --- | --- | --- |
| | F1 | F3 |
| E1 | P(E1|F1) | P(E1|F3) |
| E2 | P(E2|F1) | P(E2|F3) |
| E3 | P(E3|F1) | P(E3|F3) |
| ... | ... | ... |

At operation 215, for each entitlement in the subset, the maximum of the ratios in the row is found, which may be represented by the following formula:

$$W(E) = MAX[P(E|Fi)]$$

where E corresponds to the entitlement and W(E) For example, where P(E1|F1) is 0.10 and P(E1|F3) is 0.5, the maximum ratio W corresponds to 0.5.

At operation 220, the entitlements are sorted based on their corresponding maximum ratio, W. At operation 225, the first N (e.g., 5) entitlements of the sorted entitlements are determined to be relevant to the target individual.

At operation 230, the ACS 102 may instruct target systems 106 and/or applications operating on the target systems 106 associated with the first N entitlements to grant access to the target individual.

In alternative implementations, at operation 235, a report of the entitlements and the corresponding ratio, W, in the form of recommendations for review by an operator may be generated. For example, a web page may be communicated to an operator to facilitate review of the recommendations. The webpage may have fields that allow the operator to approve or reject the recommendations.

At operation 240, the operator may submit the web page form with decisions to the ACS 102. The ACS 102 may in turn instruct target systems 106 and/or applications operating on the target systems 106 associated with approved entitlements to grant access to the target individual.

At operation 245, the model 120 may be updated to reflect the entitlements attributed to the target individual.

Figure 3:
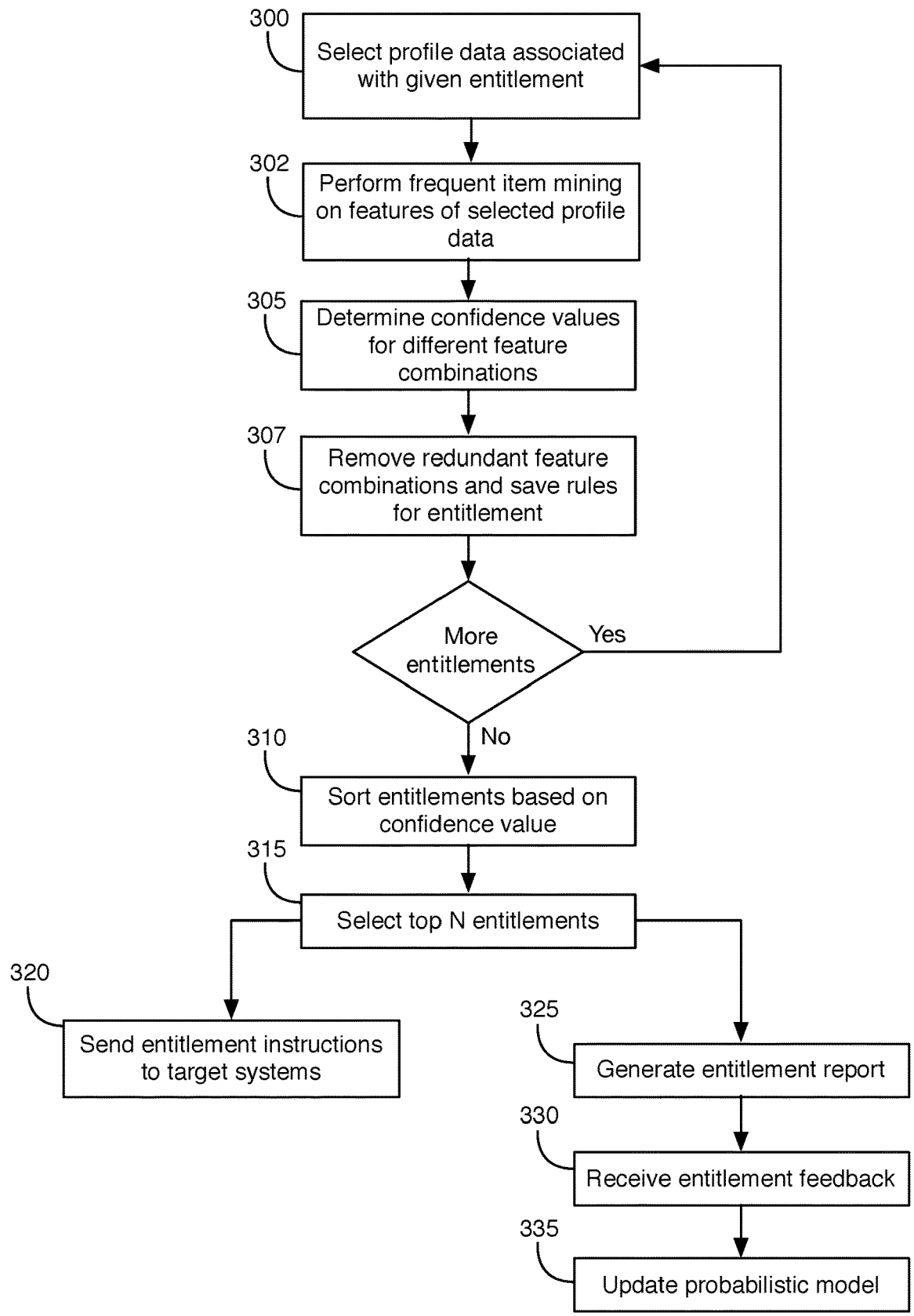
FIG. 3 illustrates second exemplary operations that implement a rules based approach to control access to a group of target systems and/or applications.
Figures 4E, 4F:
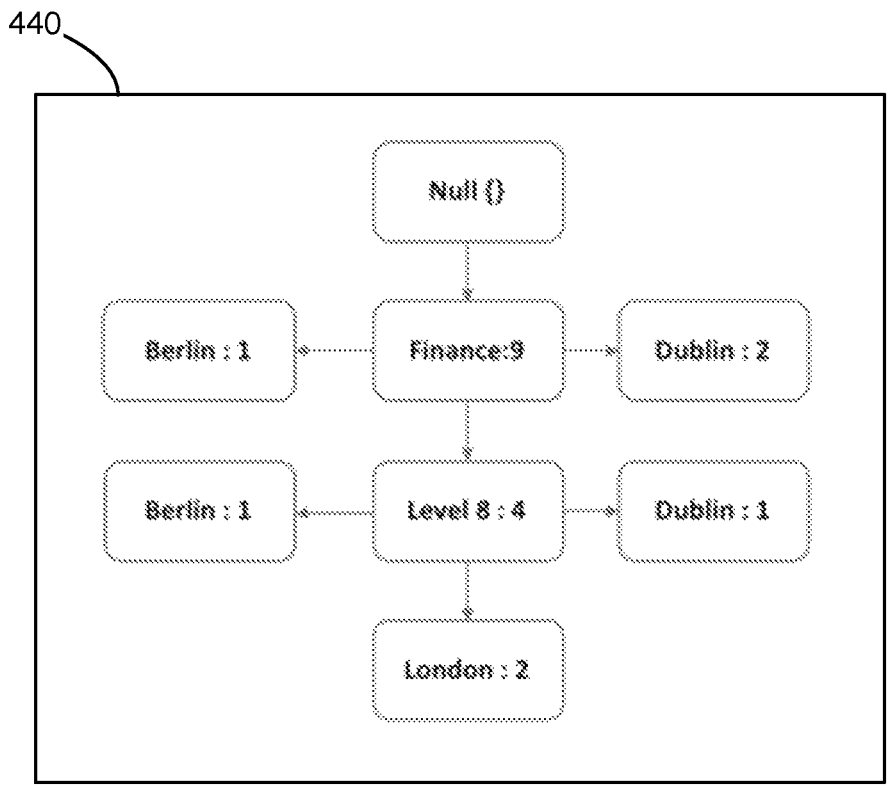

FIG. 3 illustrates second exemplary operations for generating rules that facilitate selection of entitlements to give an individual that allow the individual access to a plurality of target systems 106. The second exemplary operations may be performed standalone or as a layer on top of the probabilistic approach of FIG. 2 as a means of hardening the probabilistic model 120. In the second exemplary operations, instead of determining proportions of one feature per entitlement, various combination of features associated with each single entitlement are identified. The operations of FIG. 3 are better understood by referencing FIGS. 4A and 4H.

Referring to FIG. 3, at operation 300, profile data associated with a given entitlement is selected. The number of employees represented in the profile data could be in the thousands, hundreds of thousands, etc., and any number of entitlements may have been granted to the employees. However, for ease of explanation, we assume a company with only ten employees and a single entitlement in operation, ENT_A, as illustrated in the exemplary table of employee profile data 400 of FIG. 4A.

According to the table 400 of FIG. 4A, employees 2-10 have entitlement ENT_A whereas employee 1 does not. Also, according to the table 400, there are three HR profile descriptors (i.e., features), namely Department, Location, and Level.

As an initial matter, and for ease of explanation, the dataset may be pruned to include just those employees that have the entitlement that is being modeled (e.g. ENT_A), as illustrated in the table 410 of FIG. 4B. Pruning may be repeated for every entitlement to be modeled, or depending on the specific algorithm adopted may facilitate an approach where pruning is not necessary and yield the same results. Each entitlement may be trained independently. Independent training based on a single entitlement at a time is beneficial in case any technical issues arise during training because the entitlements that have been modelled up to the point where the technical issues occurs can be safely stored and the training may continue where it left off. Entitlements may also be trained in batches or groups, and may be trained simultaneously. Thus, this aspect of training may be considered as the discovery of the rules of an entitlement.

At operation 302, so called frequent-item-mining may be performed on features of selected profile data. That is, the frequency of all HR features in the dataset above a threshold (known as the support) may be calculated and a prioritized list may be created according to the frequency of occurrence, as illustrated in the table 420 of FIG. 4C. Each transaction, or employee profile, may then be rearranged by this prioritized list, as illustrated in the table 430 of FIG. 4D.

In one exemplary implementation, an FP-growth algorithm may be utilized to perform the frequent item mining. The FP-growth algorithm may be implemented on a data analytics execution engine of the ACS 102, such as Apache Spark® and the algorithm may generate the tree diagram 440 illustrated in FIG. 4E by iterating through each employee transaction. This tree may be considered as a model that contains all the rules listed in the table 440 of FIG. 4F of the entitlement which can be extracted. This approach may negate the need for profile pruning, and run on the entire employee dataset simultaneously (i.e., those that have and do not have the entitlement in question).

At operation 305, confidence values for different feature combinations/rules may be determined. As noted above at operation 300, the employee list may be limited to just those employees having the entitlement being modeled. As such, the rules listed in table 450 of FIG. 4F were specific to the modeled entitlement and did not consider the profiles of the employees that did not have the entitlement. As such, if confidence scores were to be assigned to each of the rules found, the confidence scores would be exactly 100%. That is, each rule that was discovered would always result in having the modeled entitlement. However, this is not reflective of the true confidence value. That is, the ratio of occurrence of the rule with the entitlement to the occurrence of the rule in the entire employee landscape. Thus, a true confidence level is calculated by determining how often a given rule occurs in the entire employee landscape, as illustrated in the table 460 of FIG. 4G. In the case where the FPGrowth algorithm is utilized, this step is not necessary as the method is capable of building the entire tree with accurate confidence scores in one step.

According to the table 460 of FIG. 4G, every employee that is in Finance and at level 8 has the entitlement ENT_A, and every financial employee that is based in Berlin has the entitlement ENT_A. The confidence level can be calculated as follows:

$$\text{Confidence} = \frac{\text{Frequency of } HR \text{ Feature \& Entitlement}}{\text{Frequency of } HR \text{ Feature in Entire Dataset}}.$$

At operation 307, redundant features combinations/rules may be removed from the rule set. After the confidence scores have been calculated for all the frequent item sets, there may be a proportion of the items that are redundant due to the rule being encompassed by a higher level (Parent) rule. For example, according to table 450 of FIG. 4F, if an employee is in Finance and at Level 8, they are 100% likely to have ENT_A. Therefore the extra location information (e.g. [Finance, Level8, Dublin] and [Finance, Level8, Berlin] and [Finance, Level8, London]) is irrelevant, as long as the employee belongs to Finance and is at level8. In this scenario, three rules may be removed, as illustrated by the stricken through rows of the table 470 in FIG. 4H.

In practice it has been found that about 90% of the discovered rules are redundant in this manner. It should be noted that rules may only be removed when the confidence scores of the parent and child are extremely similar (e.g., all are 100%). Notice that [Finance, Level8] is not made redundant by the fact that [Finance] alone exist. This is because there is a 10% difference in the confidence score and, therefore, the additional information may be important in this instance. This point may be important for prediction as well. It is important to find the highest level reason for assigning an employee an entitlement, and this step promotes this aspect. For example, if there was an entitlement that all employees in an organization had, for example, a 'birthright' entitlement, then the only relevant reason for assigning an individual that entitlement is the fact that they are an employee. All other rules that might be discovered for that entitlement would be irrelevant.

Similarly, if a project team of 25 people need an entitlement, then all that should matter is that they are on that project. The specific tasks/functions they do or have on the project may be irrelevant. However, if only 5 IT employees on the project need the entitlement, then the fact that they are on the project AND belong to IT—is the highest level reason. The previous points assume that the rules in question have the same (or very similar) confidence scores. That is, the additional information of the child rule does not impact the confidence score that was found for the parent.

The operations above may be performed on all or a subset of entitlements identified in the profile data. For each entitlement, a rules table such as the table 470 in FIG. 4H may be saved.

Subsequent operations that may be performed are similar to those described above in operations 220-230. For example, at operation 310, the entitlements may be sorted based on the corresponding maximum confidence values. At operation 315, the first N entitlements of the sorted entitlements may be determined to be relevant to the target individual. At operation 320, these entitlements may be assigned to the target individual automatically or may be presented, along with the corresponding confidence values, to a reviewer at operation 325 as recommendations to be approved or rejected at operation. Feedback may be received at operation 330, and the model 120 may be updated at operation 335.

In some cases it may be useful to predict the number of rules that may be generated by the operations above before performing the operations on an entire dataset. This facilitates predicting memory usage and/or other resource requirements that the system will need, which is beneficial to know during system implementation. In some implementations, this may be accomplished by performing the operations on using a training dataset. The training dataset may be repetitively processed to identify rule associated with a relatively small but representative sample of entitlements over a range of features. Each runs through the dataset would be enough to facilitate determination of relationships that would facilitate prediction of how many rules would be expected to be generated for each entitlement and each choice of feature parameter.

In yet other implementations, the rules generated above may be validated, for example, by testing whether the confidence values for the rules confirm with underlying data.

Figure 5:
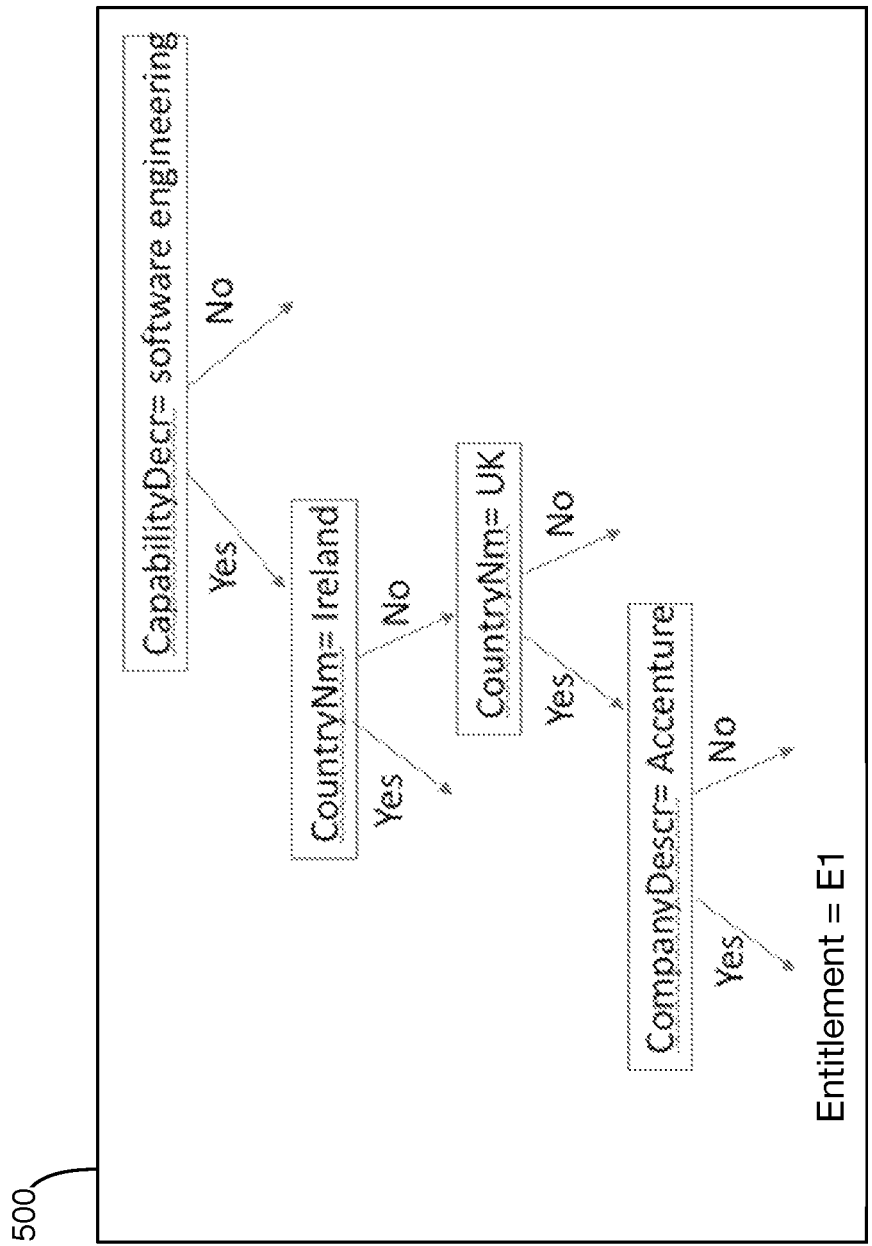
FIG. 5 illustrates part of an exemplary predictive model that corresponds to a decision tree.
Figure 6:
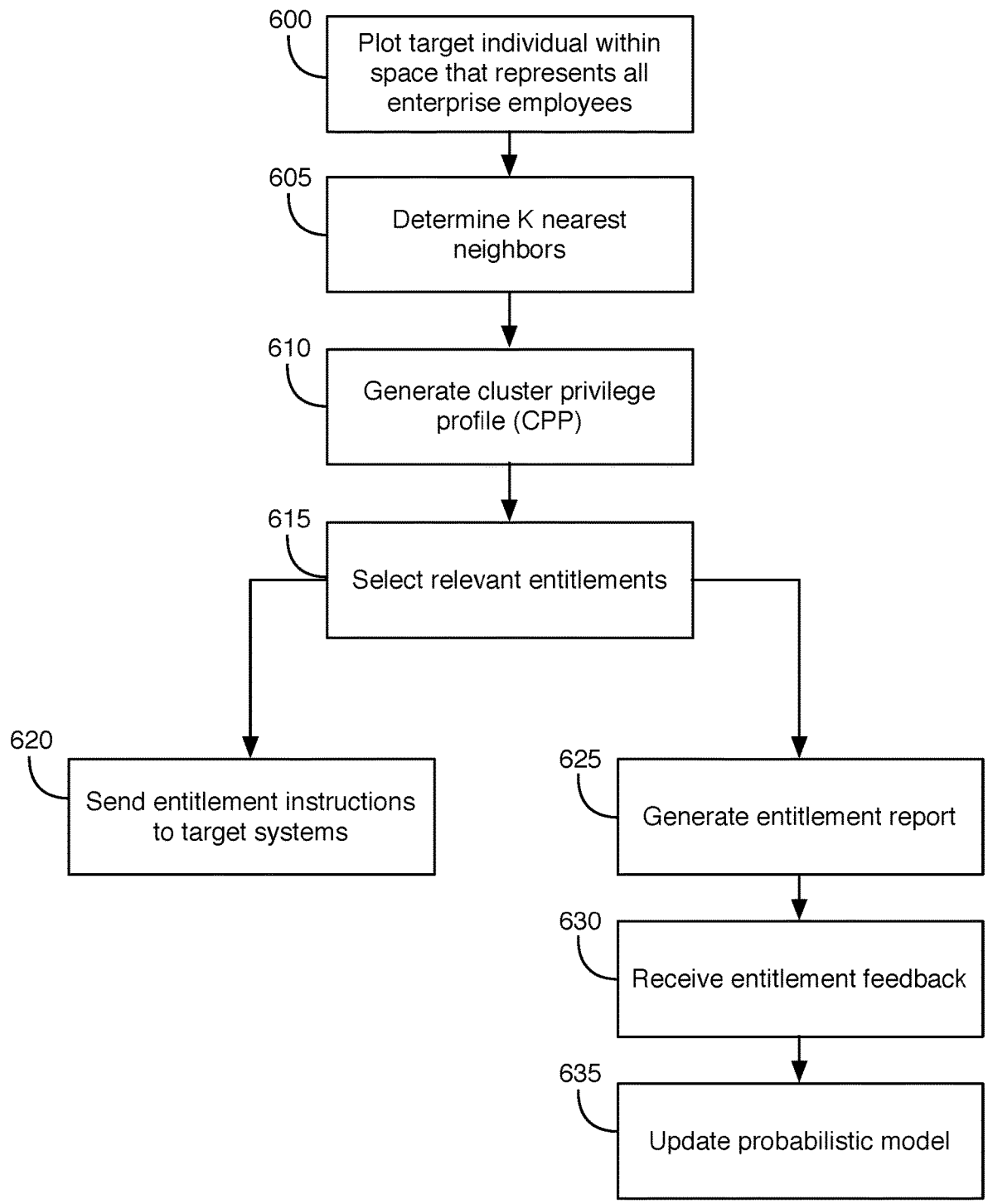
FIG. 6 illustrates operations for generating a predictive model according to a K-Nearest Neighbors algorithm.

FIGS. 5 and 6 illustrate different types of predictive models 120 that may be generated to facilitate controlling access to a plurality of target systems 106. For example, FIG. 5 illustrates part of an exemplary predictive model 500 that corresponds to a decision tree, where each node corresponds to a feature. The decision tree model 500 may have been trained based on employee profile data received from the HR system 104. Main features of the exemplary predictive model 500 used for training the model 500 in this case included CapabilityDescr, CountryNm, CompanyDescr. Other features used for training that are not illustrated in the graph may include CostCenterDescr, FacilityDescr, MetroCityDescr, ProfitCenterDescr, TalentSegmentDescr, time_since_joined, and many other features.

During training, the decision tree model 500 may learn the rules necessary to facilitate predicting an outcome that corresponds to a privilege/entitlement. These rules are made by splitting a node at each feature and selecting one out of two possible paths. For example, if "CapabilityDescr" is "software engineering", "CountryNm" is "UK" and "CompanyDescr" is "Accenture", then the entitlement output of the decision tree model 500 would be E1.

FIG. 6 illustrates exemplary operations for generating a predictive model according to a K-Nearest Neighbors algorithm. At block 600, the target individual may be plotted in a space that represents all employees of the enterprise.

At block 605, the nearest neighbors of the target individual based on features are determined. For example, K may be set to 3, 5, or 7 in a K-nearest neighbor algorithm to select employees of the enterprise having features similar to those of the target individual.

At block 610, a cluster privilege profile (CPP) that represents entitlements of the nearest neighbors of the target individual is generated, as illustrated in Table 4.

TABLE 4

|  | E1 | E2 | E3 | E4 | E5 | E6 | ... | E N |
|---|---|---|---|---|---|---|---|---|
| Employee 1 | 1 | 0 | 1 | 0 | 0 | 0 |  | 0 |
| Employee 2 | 1 | 1 | 0 | 0 | 0 | 0 |  | 0 |
| Employee 3 | 1 | 1 | 1 | 1 | 0 | 0 |  | 0 |
| Weight | 3 | 2 | 2 | 1 | 0 | 0 |  | 0 |
| Confidence | 100% | 67% | 67% | 33% | 0% | 0% | 0% | 0% |

Referring to Table 4, each column represents a possible entitlement that a corresponding neighbor employee may have. A value of 1 in the cell indicates that the employee has the corresponding entitlement and a value of 0 indicates that the employee does not have the corresponding entitlement. The weight for each entitlement corresponds to the sum of the cell values in the column and the confidence for each entitlement corresponds to the ratio of the weight/number of neighbors. Thus, according to Table 4, the entitlement having the highest confidence corresponds to E1. The next highest are E2 and E3 and so on.

At block 615, the entitlements having a confidence higher than a predetermine threshold (e.g., >50%) are determined to be relevant to the target individual.

At operation 620, the ACS 102 may instruct target systems 106 and/or applications operating on the target systems 106 associated with these entitlements to grant access to the target individual. As with the other approaches, a list of recommendations may be communicated to a reviewer (operation 625) who may accept or reject the recommendations made by the ACS 102 (operation 630). The model 120 may be updated based on the feedback provided by the reviewer (operation 635).

Other predictive models may be utilized. For example, in another embodiment, an ensemble method may be utilized generate an ensemble model. The central goal of an ensemble method is to aggregate predictions made by multiple classification models. For example, in one ensemble method, training data that corresponds to feature data associated with all the employees of the enterprise is broken into subsets of training data. Different models are trained for each subset of training data.

After training each model, test data may be used to calculate the average performance of the model per entitlement. The entitlement data may be represented in binary vector form and the performance of the model may be measured either by the average precision, recall, and/or F1 score.

The various embodiments described above facilitate efficiently configuring entitlements for new employees of the enterprise 100. In addition to configuring entitlements for employees, the ACS 102 may also facilitate automatic revocation of entitlements for one or more individuals based on usage criteria. For example, referring to FIG. 7, at operation 700, a first target system 106 may report usage information to the ACS 102. The usage information may indicate the frequency with which individuals utilized the target system 106, the last time the individuals used the target system 106, and/or a different usage metric.

At operation 705, the ACS 102 may compare the usage information to a usage threshold to determine whether revocation of an entitlement is warranted.

If at operation 710, revocation is warranted, then at operation 715, the ACS 102 communicate instructions to the target system 106 to revoke the entitlement.

At operation 720, the ACS 102 may update information in the model to reflect that the individual whose entitlement has been revoked, no longer has the entitlement.

Figure 7:
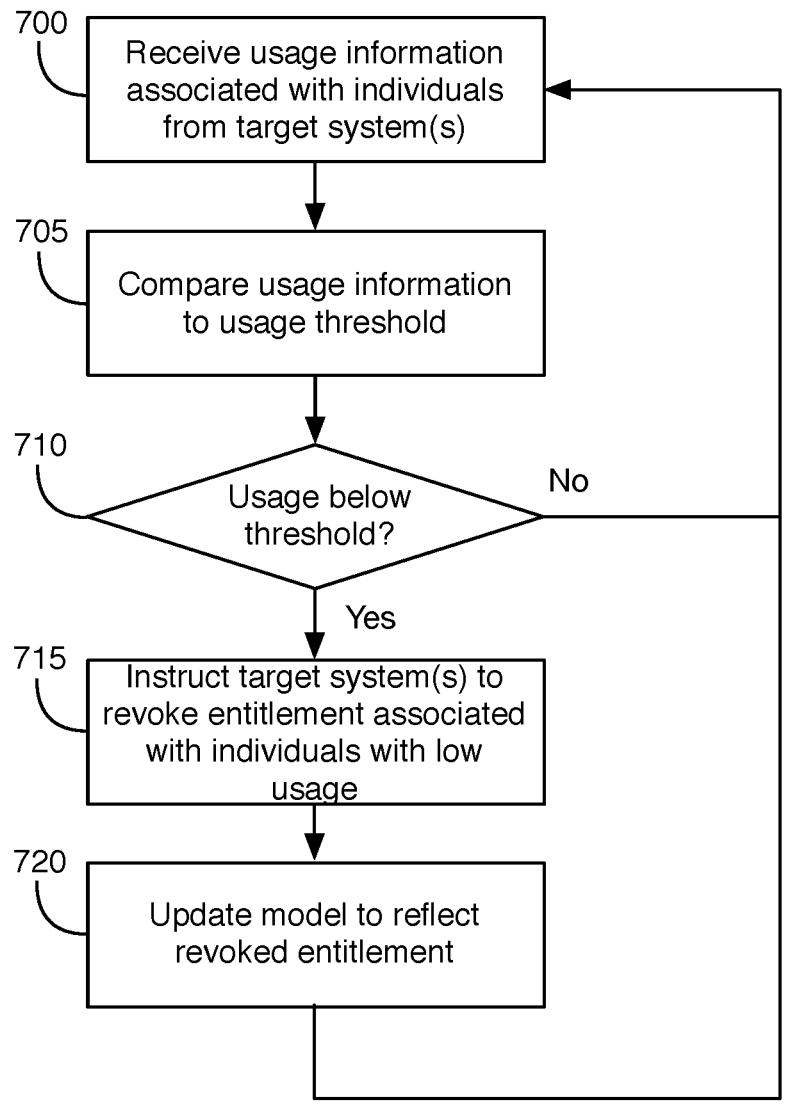
FIG. 7 illustrates operations for automatic revocation of entitlements for one or more individuals based on usage criteria.

The operations described in FIG. 7 may occur at regular intervals such as every day, week, month, etc. or in real time. The operations facilitate reducing the number of unnecessary entitlements, which has the added benefit of improving security of the target systems 106 by reducing the number of individuals with access to the target system 106. The changes to the model may result in changes to the predictions made above when assigning entitlements to target individuals. In this way, over time, entitlements may be provided to those with a real need to access the target systems 106 rather than all or an unnecessarily large number of individuals across the enterprise.

Figure 8:
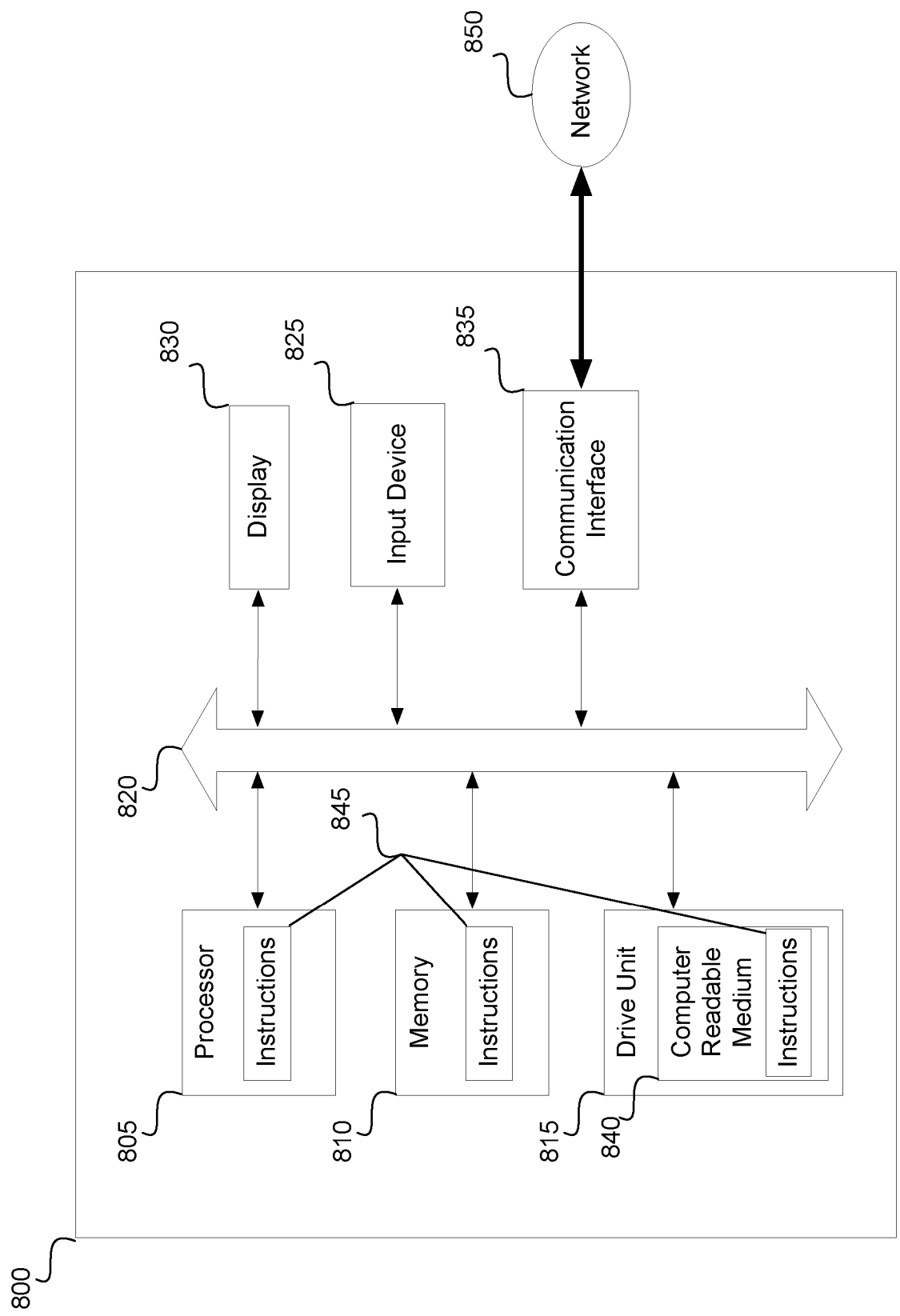
FIG. 8 illustrates an exemplary computer system that may form part of or implement the systems described in the figures or in the following paragraphs.

FIG. 8 illustrates a computer system 800 that may form part of or implement the systems, environments, devices, etc., described above. The computer system 800 may include a set of instructions 845 that the processor 805 may execute to cause the computer system 800 to perform any of the operations described above. The computer system 800 may operate as a stand-alone device or may be connected, e.g., using a network, to other computer systems or peripheral devices.

In a networked deployment, the computer system 800 may operate in the capacity of a server or as a client computer in a server-client network environment, or as a peer computer system in a peer-to-peer (or distributed) environment. The computer system 800 may also be implemented as or incorporated into various devices, such as a personal computer or a mobile device, capable of executing instructions 845 (sequential or otherwise) causing a device to perform one or more actions. Further, each of the systems described may include a collection of subsystems that individually or jointly execute a set, or multiple sets, of instructions to perform one or more computer operations.

The computer system 800 may include one or more memory devices 810 communicatively coupled to a bus 820 for communicating information. In addition, code operable to cause the computer system to perform operations described above may be stored in the memory 810. The memory 810 may be a random-access memory, read-only memory, programmable memory, hard disk drive or any other type of memory or storage device.

The computer system 800 may include a display 830, such as a liquid crystal display (LCD), a cathode ray tube (CRT), or any other display suitable for conveying information. The display 830 may act as an interface for the user to see processing results produced by processor 805.

Additionally, the computer system 800 may include an input device 825, such as a keyboard or mouse or touchscreen, configured to allow a user to interact with components of system 800.

The computer system 800 may also include a disk or optical drive unit 815. The drive unit 815 may include a computer-readable medium 840 in which the instructions 845 may be stored. The instructions 845 may reside completely, or at least partially, within the memory 810 and/or within the processor 805 during execution by the computer system 800. The memory 810 and the processor 805 also may include computer-readable media as discussed above.

The computer system 800 may include a communication interface 835 to support communications via a network 850. The network 850 may include wired networks, wireless networks, or combinations thereof. The communication interface 835 may enable communications via any number of communication standards, such as 802.11, 802.12, 802.20, WiMAX, cellular telephone standards, or other communication standards.

Accordingly, methods and systems described herein may be realized in hardware, software, or a combination of hardware and software. The methods and systems may be realized in a centralized fashion in at least one computer system or in a distributed fashion where different elements are spread across interconnected computer systems. Any kind of computer system or other apparatus adapted for carrying out the methods described herein may be employed.

The methods and systems described herein may also be embedded in a computer program product, which includes all the features enabling the implementation of the operations described herein and which, when loaded in a computer system, is able to carry out these operations. Computer program as used herein refers to an expression, in a machine-executable language, code or notation, of a set of machine-executable instructions intended to cause a device to perform a particular function, either directly or after one or more of a) conversion of a first language, code, or notation to another language, code, or notation; and b) reproduction of a first language, code, or notation.

While methods and systems have been described with reference to certain embodiments, it will be understood by those skilled in the art that various changes may be made and equivalents may be substituted without departing from the scope of the claims. Therefore, it is intended that the present methods and systems not be limited to the particular embodiment disclosed, but that the disclosed methods and systems include all embodiments falling within the scope of the appended claims.

We claim:

1. A system for controlling access to one or more of a plurality of target systems and/or applications, the system comprising:
   an input/output (IO) subsystem configured to receive profile data that defines one or more features associated with a target individual from a first user management system, and to communicate instructions to one or more target systems to facilitate access to the one or more target systems/applications by the target individual;
   a storage device that includes a plurality of rules, at least some of the rules arranged in one or more sets of rules, each set of rules being associated with an entitlement of the profile data, each entitlement being indicative of target system/application access, wherein each rule within a set relates a combination of one or more features of the profile data with a confidence value, the confidence value indicative of a ratio of a number of the rules arranged within the one or more sets associated with the entitlement to a total number of the plurality of rules having the combination of the one or more features;
   a processor in communication with the IO subsystem and the storage device; and non-transitory computer readable media in communication with the processor that stores instruction code which, when executed by the processor, causes the processor to: control the IO subsystem to receive the profile data associated with a target individual;
   generate, based on the profile data and the one or more sets of rules, a listing that includes one or more entitlements associated with the target individual, and confidence values associated with the one or more entitlements, each confidence value indicative of whether the target individual should be granted a corresponding entitlement; and
   for each entitlement having a corresponding confidence value higher than a predetermined threshold, control the IO subsystem to communicate an instruction to a target system associated with the entitlement to allow the target individual access to the target system.

2. The system according to claim 1, wherein the one or more sets of rules are generated by the processor, wherein in generating the one or more sets of rules, the instruction code causes the processor to: select, from the profile data, transactions associated with a given entitlement; process the selected transactions through a frequent item mining algorithm to determine rules associated with the entitlement; determine confidence values for each rule; and store the rules and associated confidence values to the storage device.

3. The system according to claim 2, wherein prior to generating the one or more sets of rules, the instruction code causes the processor to: repetitively process a subset of the profile data to predict a number of rules needed to processes the profile data.

4. The system according claim 2, wherein the instruction code causes the processor to remove redundant rules prior to storing the rules.

5. The system according to claim 2, wherein the frequent item mining algorithm corresponds to an FP-Growth algorithm.

6. The system according to claim 2, wherein the instruction code causes the processor to implement data analytics execution engine to generate a tree diagram of the transactions.

7. The system according to claim 1, wherein the profile data comprises employment role data of a person and entitlement data of other employees.

8. The system according to claim 1, wherein the target individual comprises a person.

9. The system according to claim 1, wherein the instruction code causes the processor to: receive usage information from one or more of the plurality of target systems, the usage information being indicative of how often individuals utilize each target system; when the usage information associated with a given individual received from a given target system indicates a usage below a predetermined threshold: communicate an instruction to the target system to revoke a corresponding entitlement associated with the target system from the individual; and update the model to reflect that the individual no longer has the corresponding entitlement.

10. A method for controlling access to one or more of a plurality of target systems, the method comprising:
    receiving profile data that defines one or more features associated with a plurality of individuals with one or more entitlements of those individuals, each entitlement indicative of target system access;
    generating one or more sets of rules, each set of rules being associated with an entitlement of the profile data, each entitlement being indicative of target system/application access, wherein each rule within a set relates a combination of one or more features of the profile data with a confidence value, the confidence value indicative of a ratio of a number of the rules arranged within the one or more sets associated with the entitlement to a total number of the plurality of rules having the combination of the one or more features;
    receiving profile data that defines one or more features associated with a target individual from a first user management system;
    generating, based on the profile data and the one or more sets of rules, a listing that includes one or more entitlements associated with the target individual, and confidence values associated with the one or more entitlements, each confidence value indicative of whether the target individual should be granted a corresponding entitlement; and for each entitlement having a corresponding confidence value higher than a predetermined threshold, communicating an instruction to a target system associated with the entitlement to allow the target individual access to the target system.

11. The method according to claim 10, further comprising:

selecting, from the profile data, transactions associated with a given entitlement;

processing the selected transactions through a frequent item mining algorithm to determine rules associated with the entitlement; determining confidence values for each rule; and storing the rules and associated confidence values to a storage device.

12. The method according claim 11, further comprising removing redundant rules prior to storing the rules.

13. The method according to claim 11, wherein the frequent item mining algorithm corresponds to an FP-Growth algorithm.

14. The method according to claim 11, further comprising implement the frequent item mining algorithm on a data analytics execution engine to generate a tree diagram of the transactions.

15. The method according to claim 10, further comprising: generating a report that includes the listing of the one or more entitlements associated with the target individual, and confidence values associated with the one or more entitlements.

16. The method according to claim 10, further comprising: receiving usage information from one or more of the plurality of target systems, the usage information being indicative of how often individuals utilize each target system;

when the usage information associated with a given individual received from a given target system indicates a usage below a predetermined threshold: communicating an instruction to the target system to revoke a corresponding entitlement associated with the target system from the individual; and updating the model to reflect that the individual no longer has the corresponding entitlement.

17. Non-transitory computer readable media that stores instruction code for controlling access to one or more of a plurality of target systems, the instruction code being executable by a machine for causing the machine to perform acts comprising: receiving profile data that defines one or more features associated with a plurality of individuals with one or more entitlements of those individuals, each entitlement indicative of target system access; generating one or more sets of rules, each set of rules being associated with an entitlement of the profile data, each entitlement being indicative of target system/application access, wherein each rule within a set relates a combination of one or more features of the profile data with a confidence value, the confidence value indicative of a ratio of a number of the rules arranged within the one or more sets associated with the entitlement to a total number of the plurality of rules having the combination of the one or more features; receiving profile data that defines one or more features associated with a target individual from a first user management system; generate, based on the profile data and the one or more sets of rules, a listing that includes one or more entitlements associated with the target individual, and confidence values associated with the one or more entitlements, each confidence value indicative of whether the target individual should be granted a corresponding entitlement; and for each entitlement having a corresponding confidence value higher than a predetermined threshold, communicating an instruction to a target system associated with the entitlement to allow the target individual access to the target system.

18. The non-transitory computer readable media according to claim 17, wherein the instruction code is executable by the machine for causing the machine to perform additional acts comprising: selecting, from the profile data, transactions associated with a given entitlement; processing the selected transactions through a frequent item mining algorithm to determine rules associated with the entitlement; determining confidence values for each rule; and storing the rules and associated confidence values to a storage device.

19. The non-transitory computer readable according claim 18, wherein the instruction code causes the machine to remove redundant rules prior to storing the rules.

20. The non-transitory computer readable according to claim 18, wherein the frequent item mining algorithm corresponds to an FP-Growth algorithm.

* * * * *